Oct. 15, 1935. G. SCHILDGEN ET AL 2,017,772
BEARING CAGE
Filed Feb. 18, 1935

INVENTORS
Georg Schildgen.
Georg Wehr.
BY A. Parker Smith
ATTORNEY

Patented Oct. 15, 1935

2,017,772

UNITED STATES PATENT OFFICE 2,017,772

BEARING CAGE

Georg Schildgen and Georg Wehr,
Schweinfurt, Germany

Application February 18, 1935, Serial No. 7,122
In Germany September 8, 1933

2 Claims. (Cl. 29—84)

This invention relates to ball- and roller-bearing cages made of plastic, and subsequently hardening, materials (such as artificial resin and the like).

Cages of this type, each composed of one or more parts, are already known, and in the case of a plural part cage the component parts have been united by riveting, cementing or like means. All these methods of attachment, however, have failed to give perfectly satisfactory results.

An object of the present invention is to provide a method enabling the cage parts to be united in a reliable, simple and economical manner.

According to the invention, spacing and fastening members (especially of metal) provided with preferably pin-shaped terminals of suitable gauge, are inserted into corresponding recesses in the cage parts, while these are still warm, so that, on the subsequent cooling and hardening, the cage parts become reliably secured by shrinking to the members, which hold them together in the correct position.

Two typical embodiments of the invention are illustrated in the accompanying drawing.

Referring first more particularly to Figs. 1 to 5, the rotary bodies $a$ (in this case balls) are shown supported, in the usual manner, by an inner raceway $b$ and an outer raceway $c$. They are guided in cages, each consisting of two rings $d$, $d_1$ of a material (such as artificial resin or the like) which is originally plastic when heated but hardens later after having cooled down. These two halves or rings, which are provided, on their opposed faces, with spherical cups $e$ to accommodate the balls, are fastened together (after the insertion of the balls) and spaced to the desired extent by members $h$ having terminal pins $g$ which are fitted into recesses $f$ provided in the rings between the said cups $e$.

The recesses $f$ and the pins $g$ are of such dimensions that the pins fit suitably (for example, friction tight) in the recesses while the rings $d$, $d_1$ are in a warm state. In such case, the pins will be gripped quite firmly when the rings have cooled down and hardened.

In the embodiment according to Figs. 1 to 5, the spacing and fastening members $h$, their terminals $g$, and accordingly the recesses $f$ in the rings are of circular cross section. In the embodiment according to Figs. 6 to 8, the corresponding parts $h'$, $g'$ and $f'$ are, for example, of polygonal cross section.

Figure 1:
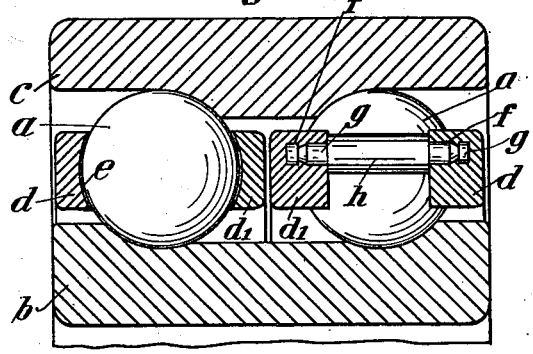
Fig. 1 represents a radial cross section, on an enlarged scale, through the raceways of a double-row ball bearing having two cages, parts being broken away and shown in section.
Figure 6:
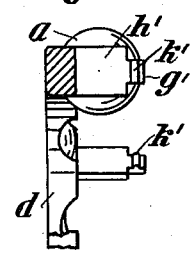
Figs. 6 to 8 show, in a manner corresponding to Figs. 3, 4 and 5, a modification with spacing and fastening members of rectangular cross section.
Figure 2:
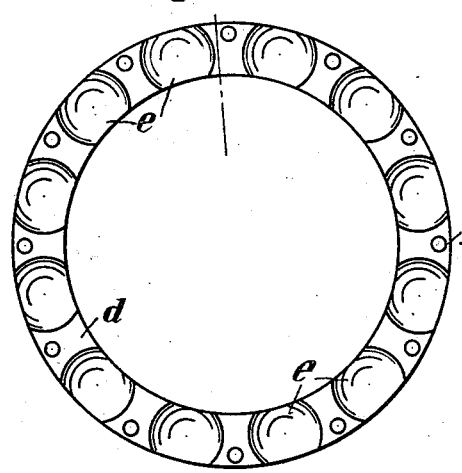
Fig. 2 is an elevation of one of the parts or halves of one cage.
Figure 3:
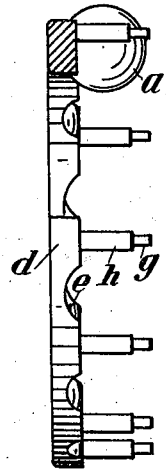
Fig. 3 is a corresponding side elevation, in partial section.
Figure 4:
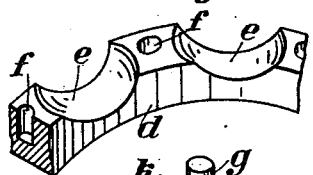
Fig. 4 is a fragmentary perspective view, on a larger scale, of a cage part.
Figure 7:
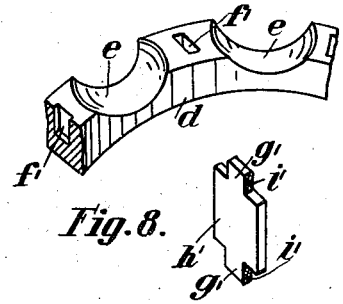
Figure 5:
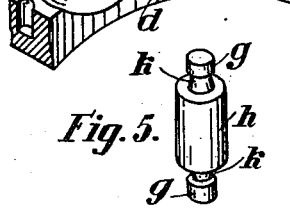
Fig. 5 is a perspective view of one of the (metallic) spacing and fastening members.
Figure 8:
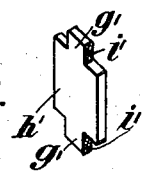

In both embodiments, the connection may be rendered particularly intimate by roughening the terminals $g$ or $g'$, or providing them with fine depressions, tooth-like projections, or the like, as indicated at $k$ in Fig. 5, and at $i'$ and $k'$ in Figs. 8 and 6 respectively.

The connection by insertion and shrinking after the two rings $d$, $d_1$ of the cage have been set in position has the great advantage, over pressing and moulding, casting, etc. the fastening members in with the plastic material, that no superfluous material, which would be troublesome and expensive to remove, reaches the fastening members. The invention also dispenses with the necessity for complicated press moulds.

From the foregoing description, it will be seen that the basic, underlying principle of the present invention comprises a new method of forming and maintaining under normal atmospheric temperatures, a rigid joint between two members, one of which is made of any material (preferably of a resinous character) which is hard at such temperatures, but expands considerably and preferably softens at materially higher temperatures, but has a fairly high coefficient of contraction during cooling, while the other member is made of a material having a much lower coefficient of contraction through the same temperature range.

Such method consists in forming a recess in the face of the first member while it is in a heated and expanded condition into which a projection from the second member may be closely fitted, and thereafter allowing the parts to cool. Such recess might be formed in the first member while it was cool and then expanded sufficiently to receive the projection from the other member by the application of heat. In either case, the more rapidly contracting material will contract the cross-section of the recess sufficiently to shrink it upon the projection from the other member and thereby subject the latter to relatively high surface pressure. Consequently, the two elements are (under room temperatures) held together by a vise-like grip of one upon the other.

While we have shown and described a ball bearing embodying the product of our invention, the invention would be equally usable in making other anti-friction bearings comprising a plurality of loosely confined rolling bodies.

Having now particularly described and ascertained the nature of our said invention and in what manner the same is to be performed, we declare that what we claim is:—

1. A product of the class described comprising a cage composed of two similar and complementary rings of material plastic when heated to a degree substantially above normal atmospheric temperatures but hard when cooled to such temperatures and having a considerable coefficient of contraction during such hardeneng process, an elongated member for holding said rings together, said member being formed of a material having a much smaller coefficient of contraction when subjected to such temperature changes, means on said member for spacing said rings apart along their common axis the extremities of such member being wholly embedded in said rings and firmly gripped by surface pressures exerted thereby.

2. A product such as defined in claim 1 in which said member's extremities each have an irregular surface, the projections on which engage said contracted ring-forming material.

GEORG SCHILDGEN.
GEORG WEHR.